Oct. 11, 1960  S. S. BROWN ET AL  2,956,263
THEFT ALARM
Filed Nov. 19, 1958  2 Sheets-Sheet 1
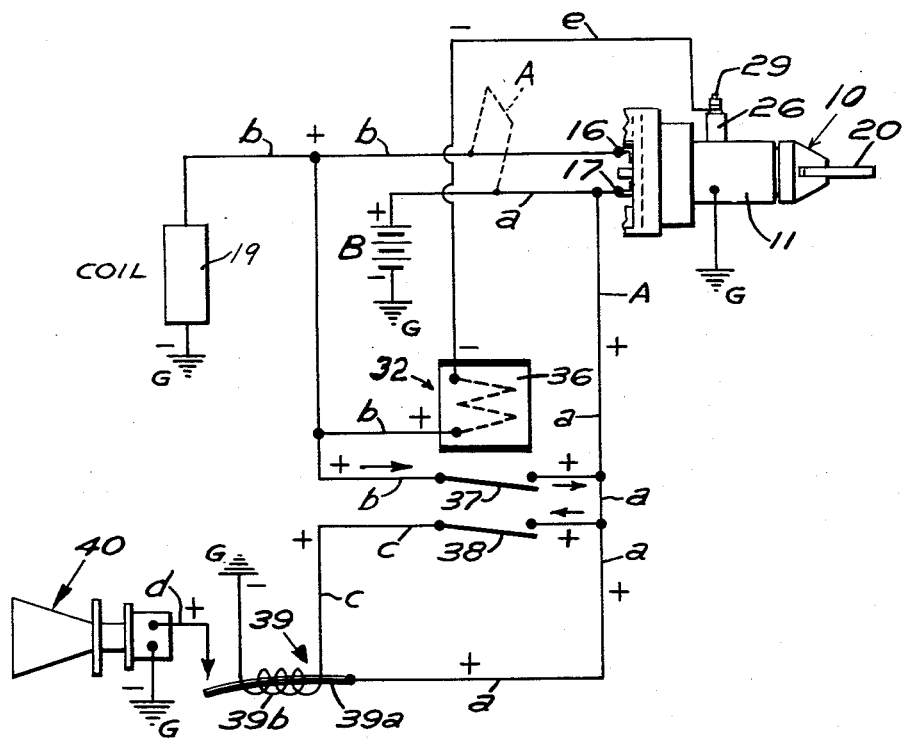
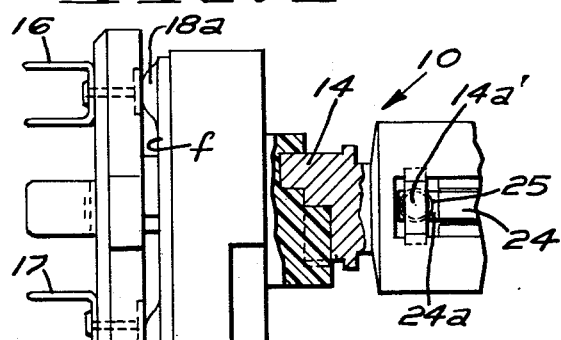
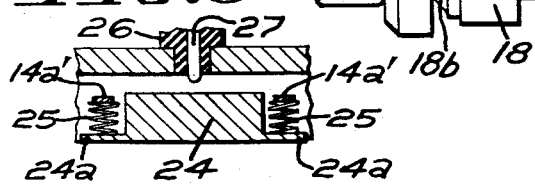
INVENTORS:
SAM S. BROWN and
JOHN BRINDA, JR.
BY: Green, McCallister and Miller
THEIR ATTORNEYS.

Oct. 11, 1960 S. S. BROWN ET AL 2,956,263
THEFT ALARM
Filed Nov. 19, 1958 2 Sheets-Sheet 2
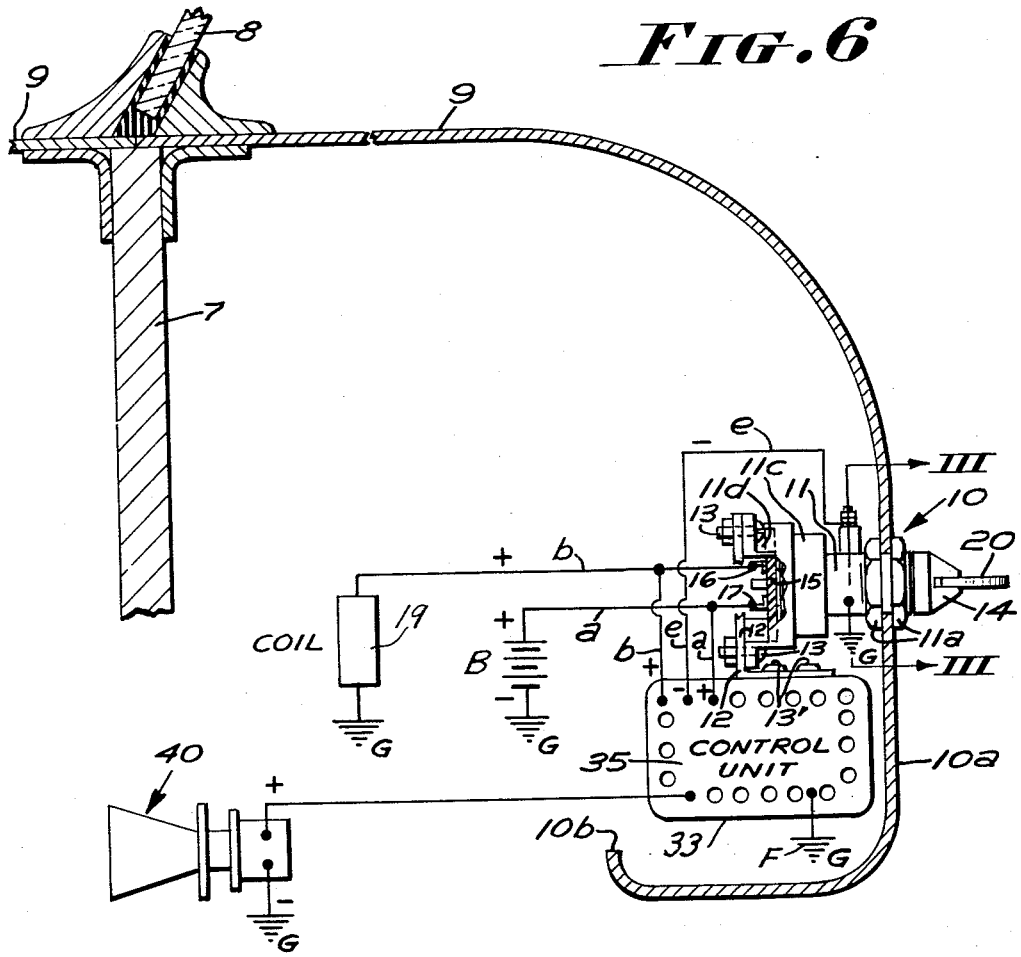
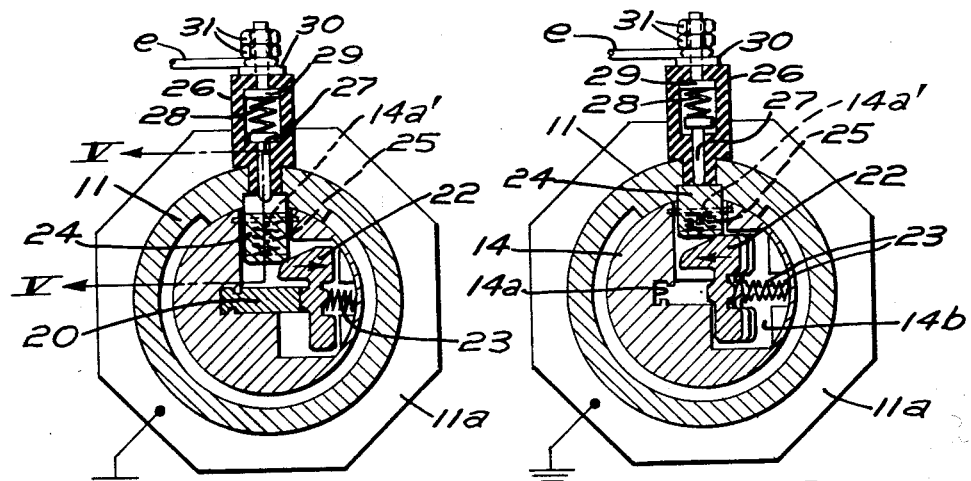

United States Patent Office 2,956,263
Patented Oct. 11, 1960

2,956,263

THEFT ALARM

Sam S. Brown, 144 N. Dithridge St., Pittsburgh 13, Pa., and John Brinda, Jr., 9233 Cromwell Drive, Pittsburgh 37, Pa.

Filed Nov. 19, 1958, Ser. No. 774,990

8 Claims. (Cl. 340—63)

This invention pertains to an alarm or alarm system suitable for motor vehicles, such as automobiles, and particularly, to a system that is operated when an unauthorized person attempts to start a motor of a vehicle by employing some means, such as a "jumper," in order to provide energization of a unit, such as the ignition coil.

The alarm or system of our invention is constructed to sound an alarm when the ignition switch of the automobile has been locked and the key removed by the owner. If, and when an unauthorized person attempts to short or cross the switch or to employ a "jumper" to provide a flow of current through the ignition coil, so that the car motor may be operated, our alarm system then becomes actuated. This system is readily adapted to conventional ignition systems of cars and has a switch mechanism that is actuated to close when the ignition switch has been locked and the key removed. In this connection, we have been able to adapt a conventional ignition switch to provide the necessary operating contacts for our system. Further, in accordance with our invention, when an ignition coil circuit is "jumped," our system may be constructed to continue to sound an alarm until the authorized owner returns and inserts his key. At this time, the switch mechanism of the system is then disconnected and the alarm de-energized.

It has thus been an object of our invention to provide an improved and simplified alarm system, apparatus or installation for motor vehicles;

Another object has been to devise an alarm for warning of an unauthorized use of a motor vehicle that will be operated when the thief attempts to "jump" or cross the ignition switch or electric lines for energizing the electrical system;

A further object has been to develop a control unit for sounding an alarm when an attempt is made to "jump" the ignition system of a motor vehicle;

These and other objects of our invention will appear to those skilled in the art from the illustrated embodiment set forth herein.

In the drawings,

Figure 1 is an electric circuit diagram illustrating operating apparatus and connections of our system and the employment of an ignition switch installation, all in accordance with our invention;

Figure 2 is a greatly enlarged end section taken along line III—III of Figure 6 through an ignition switch modified in accordance with our invention, and showing the switch in a locked position with its key removed;

Figure 3 is a view similar to Figure 2, but showing the ignition switch in an unlocked position with its key inserted;

Figure 4 is a fragmental side view in elevation illustrating parts of the ignition switch of Figures 2 and 3;

Figure 5 is a fragmental top plan view taken along line V—V of Figure 3 to illustrate the construction and mounting of a latching element employed in the ignition switch; and Figure 6 is a somewhat diagrammatic side view in sectional elevation through the front instrument panel of a motor vehicle showing a system or apparatus of our invention in an installed or suitably mounted relationship with respect thereto.

Referring particularly to Figures 1 to 6, inclusive, of the drawings, we have shown a motor car ignition switch 10 which may be of a type such as available commercially and manufactured by the Delco Remy Company, for example, for Chevrolet motor cars. This switch has a hollow metal shell 11 that receives a rotating tumbler metal plug 14 therein which at its outer end has an open portion to receive a conventional key 20. The tubular housing 11 is integral with an enlarged back housing portion 11c that carries a dielectric or insulator tumbler plug 18 of suitable resin material which is mounted therein for rotation and that, as shown in Figure 4, carries connected switch terminals 18a and 18b. As will be noted in Figure 4, the switch terminals are connected by a common lead f, so that when the plug 18 is rotated to a position such that its terminals 18a and 18b make electrical contact with the terminals of back-projecting lug connectors 16 and 17 that there will be a flow of positive current therebetween. As also shown in Figure 4, the metal plug 14 endwise-detachably fits within the dielectric plug 18, and both have interfitting portions, so that rotation of the plug 14 will provide a corresponding rotation of the plug 18.

Although in a commercial ignition switch, there may be additional lug connectors for switch contacts to energize a radio or other electrical equipment, without energizing the ignition coil, such structure is not part of the present invention and has not been illustrated. As shown particularly in Figures 2 and 3, when a key 20 has been inserted within the front end of the rotating plug 14 and along its slotted bore portion 14a, it will cause a cam finger element 22 to move to its outer position of Figure 3 and permit a radially-operatively positioned sliding catch pin or latch element 24 to move inwardly within the plug 14 and unlatch it with respect to the housing of the fixed shell 11. Figure 2 illustrates the latched position of the element 24 that occurs when the cam 22 is in its inwardly-urged position, as effected by tension of a coil spring 23 that is mounted between an offset portion of the cam and an inner wall portion of the plug 14.

In the type of ignition switch 10 which is illustrated, when the key 20 has been inserted, the cam spring 23 is compressed to the position shown in Figure 3 to permit side-positioned coil springs 25 (see particularly Figures 2 and 5) that cooperate with the element 24, to move it to an inner, releasing or unlatched position. As shown particularly in Figure 5, the element 24 has projecting under-ledge portions 24a against which inner ends of a pair of coil expansion springs 25 abut to normally urge the element 24 to its inner, radial position. The outer ends of the coil springs 25 are held in position by abutment with cross-extending portions 14a' of the plug 14.

As shown particularly in Figures 2 and 3, and in accordance with our invention, the housing of the fixed shell 11 is provided with a radial bore therein to receive a radially-inwardly projecting dielectric fixed terminal plug 26 that is set to extend radially-outwardly therefrom. A headed contact pin or element 27 is operatively positioned within the inner end of the plug 26 to form an electric contact with the metal latch element 4 when, as shown in Figure 2, the latter is in its outward or latched position. The contact made by the pin 27 is flexibly maintined by an expansion coil spring 28 that is carried within the bore of the plug 26. As will be noted, the spring 28 is secured, as by soldering, to one end of the pin element 27 and, at its other end, to a fixed pin element 29. The fixed pin or terminal element 29 projects outwardly from the outer end of the dielectric plug 26 and is threaded to receive washer 30 and clamping nuts 31, so that an electrical connection or lead e may be secured in position thereon. When the latch element 24 is in its inner or unlatching position, as shown in Figure 3, as effected by the tension of the side springs 25, the plug 14 may be rotated to rotate plug 18 and move the ignition switch from an open to at least one closed contact posiiton, as shown in connection with Figure 4, so as to energize an ignition coil 19 of the system, see Figure 1.

Referring particularly to Figure 6 of the drawings, the ignition switch unit 10 is secured on a dashboard 9 of the vehicle, below its windshield 8, by mounting nuts 11a that are threaded on a threaded outer end portion 11b of the housing 11. The back and enlarged housing portion 11c carries mounting feet 11d that may, as shown, be secured to a mounting plate 12 by nut and bolt assemblies 13. The mounting plate 12 has a hollow central portion to permit electrical leads to be taken from the back end of the switch unit 10, and at its lower end may be secured to the top of a box 33 of a control unit by nut and bolt assemblies 13', which box, in turn, may be mounted on the dashboard within the confines of its inwardly-projecting flange portion 10b. The box 33 is adapted to carry a control unit 35 which will be hereinafter described. We have also shown an alarm unit, such as a conventional horn 40, associated with the control unit 35.

In the circuit diagram of Figure 1, the conventional storage battery B of a vehicle is shown as connected in a conventional manner on its negative side to the ground, and on its positive side by a lead a to the ignition switch lug or terminal 17. When the ignition switch terminals 16 and 17, see Figure 4, are closed by the lead f of the ignition switch, then positive current will flow from line a, along line f to line or lead b to the positive side of the ignition coil 19 to energize the electrical ignition system and thus permit the vehicle motor to be started. This occurs when the plug 14 is rotated after the ignition switch key 20 has been inserted to effect a rotation of the dielectric plug 18 and its switch contacts 18a and 18b. The terminal element 29 is connected through line or lead e to the negative side of a solenoid relay switch unit 32 which, with a time delay switch unit 39, provides the compact control unit 35 of Figure 6.

The holding coil 36 of the relay switch control 32 is on its positive side connected through lead b to the positive side of the ignition coil 19 and to the switch blade element of switch 37. The contact terminal of the switch 37 is connected through lead a to ignition switch terminal lug 17 and to the contact terminal of a second switch 38. Both switches 37 and 38 are simultaneously closed by the holding coil 36 when the latter is energized by a flow of current through leads b and e. It will be noted that a negative connection is made to the ground by the housing 11, the plug 14, the latch 24, and terminal pin 29 of the ignition switch 10. Thus, when latch element 24 is in its latched position of Figure 2, the terminal pin 29 of post 26 is also connected to the ground; as a result, the lead e is always connected to the negative side of the battery B when the ignition switch key 20 has been removed.

As shown in Figure 1, the blade of the switch 38 is connected through lead or line c to the positive side of a holding coil 39b of the time-delay switch unit 39 to energize it when such blade is in a closed position, as effected by the energization of the coil 36. The energization of the coil 39b, after a time delay period determined by switch blade 39a (shown of a bi-metallic type), causes current to flow from the positive lead a through a switch terminal to the positive lead or line d of the alarm unit 40, thus energizing it to sound an alarm.

In this system, the switch 37, as used, will in its closed position continue the energization of the coil 36 of the unit 32, even if jumper A, see Figure 1, is removed. That is, after the switch contacts of the unit 32 are closed, they will remain closed until the ignition switch key 20 is inserted in the switch 10. The purpose is to inform the owner that someone has been tampering with his vehicle, so that he can hurry to its parking place and so that the thief will be frightened away. Thus, employing the switch 37, the positive line b is energized through the lead a until the key 20 is inserted in the ignition switch 10 to break the negative switch contact of Figure 2. At this time, the system is ready for reuse in the conventional manner. The switch 38 is also moved and held in a closed position as long as the coil 36 is energized, to maintain energization of the time-delay unit 39 and a flow of current to continuously activate the alarm 40.

Also, it will be appreciated that our time-delay switch control unit 39 may be eliminated if it is desired to immediately energize the alarm 40. If this is done, the lead c is directly connected to the lead d and energization will be directly effected between the leads a and b by the blade of the switch 38 when it is closed. Although we have shown a bi-metallic type of unit 39 for the purpose of illustration, it will be apparent that a vacuum tube or other conventional type of time-delay unit may be used.

What we claim is:

1. In an alarm system to give warning of the jumping of an ignition switch when in its open position to prevent an unauthorized use of a motor vehicle having an ignition coil connected to one side of a source of energy and through the ignition switch when it is closed to the other side of the source of energy, a control unit, switch means for connecting said control unit to the one side of the source of energy when the ignition switch is open and for disconnecting it therefrom when the ignition switch is closed, said control unit being energized through the other side of the source of energy when a jumper is employed across the open ignition switch to connect the ignition coil to the other side of the source of energy, an alarm unit connected to the one side of the source of energy, and said control unit connecting said alarm unit to the other side of the source of energy when it is energized in the above-defined manner.

2. An ignition switch for a motor vehicle having a housing and a rotatable tumbler operatively positioned therein, ignition switch contacts actuated by a turning of said tumbler to open and close off an ignition coil energizing circuit, said tumbler operatively carrying a latching element, means normally urging said latching element into latching engagement with said housing, cam means in said tumbler and actuated by the insertion of a key therein to move said latching element to an unlatching position with respect to said housing, a switch contact carried by said housing, said latching element defining a second switch contact that is opened and closed with respect to said housing contact to open and close into a control unit circuit, and said tumbler and key being constructed to close the second switch contact when the ignition coil energizing circuit is opened by said ignition switch contacts, and vice versa.

3. In an alarm system to give warning of the jumping of an ignition switch when in its open position to deter the unauthorized use of a motor vehicle, a source of energy, control means, a control means circuit having switch means for connecting one side of said source to said control means when the ignition switch is opened, an ignition coil connected directly to the one side of said source and connected indirectly to the one side of said source through said control means and said switch means when said switch means is in a closed position, said ignition coil being connected through the ignition switch to the other side of said source when the ignition switch is closed, an alarm unit directly connected to the other side of said source, said control means when energized having means for connecting the other side of said source to said alarm unit to energize it, said control means circuit being open when said ignition switch is closed, and said control means being energized with the ignition switch in its open position only when a jumper is employed to provide a connection between the ignition coil and the other side of said source of energy.

4. A system as defined in claim 3 wherein said control means comprises a relay unit having an electrically-energized holding coil and at least one switch arm operated thereby, said holding coil being connected at one end through the switch means to the one side of said source when said switch means is closed and at its opposite end directly to one end of said switch arm, and a contact point adjacent the opposite end of said switch arm connected to said alarm unit and the other side of said source, whereby the switch arm of said relay unit closes on said contact point to energize said alarm unit and form a holding circuit for said holding coil when said holding coil is energized by a jumper placed across the ignition coil and the other side of said source of energy.

5. A system as defined in claim 3 wherein said control means comprises a relay unit having an electrically-energized holding coil and a pair of switch arms operated thereby, said holding coil being connected at one end through the switch means to the one side of said source when said switch means is closed and at its opposite end directly to one of said switch arms, a thermally operated time delay unit, the other of said switch arms being connected to said time delay unit, said time delay unit having a switch contact which is closed by the energization of said time delay unit, and a contact point adjacent the swing end of each of said switch arms connected to said alarm unit and the other side of said source, whereby said switch arms of said relay unit close on said contact points to energize said time delay unit and close said time delay switch contact to sound said alarm unit and provide a holding circuit for said holding coil when said holding coil is energized by a jumper placed across the ignition coil and the other side of said source of energy.

6. In an alarm system to give warning of the jumping of an ignition switch when in its open position with respect to an ignition coil and deter an unauthorized use of a motor vehicle carrying a source of energy, an additional pair of switch contacts carried by the ignition switch that are moved to a closed position when the ignition switch is moved to its open position with respect to the ignition coil, one of said contacts being connected directly to one side of the source of energy, a control unit connected through said switch contacts to the one side of the source of energy when said switch contacts are in a closed position, a lead connecting said control unit to said ignition coil, said control unit being connected to the other side of the source of energy and thereby being energized when a jumper is employed to energize the ignition coil, an alarm unit, a lead line connecting said alarm unit to the one side of the source of energy, said control unit having relay switch means for connecting said alarm unit thereto, and said relay switch means being energized by said control unit to effect an energization of said alarm unit.

7. An alarm system as defined in claim 6 wherein a thermal time delay unit is connected between said relay switch means and said alarm unit to delay the activation of said alarm unit when said control unit is energized, and said relay switch means completes a holding circuit to continuously activate said time delay unit until said additional pair of switch contacts are open.

8. A system as defined in claim 6 wherein said relay switch means comprises a holding coil and a double pole switch which is closed when the holding coil of said control unit is energized, one of said switches when closed connecting the coil of said control unit to the other side of said source of energy to continue its energization after the jumper has been removed, and the other of said switches when closed connected to said alarm unit through a thermal time delay switch to energize the alarm unit.

References Cited in the file of this patent

UNITED STATES PATENTS

| | | |
|---|---|---|
| 1,429,247 | Mathews | Sept. 19, 1922 |
| 2,453,903 | Gray | Nov. 16, 1948 |
| 2,607,837 | Federuk | Aug. 19, 1952 |
| 2,610,238 | Joksch | Sept. 9, 1952 |
| 2,782,396 | Marsh et al. | Feb. 19, 1957 |
| 2,840,795 | Yun Gee | June 24, 1958 |